3,303,206
HALOGENATED THIOCYANATO PHENOLS
Walter Reifschneider, Midland, Mich., assignor to The Dow Chemical Company, Midland, Mich., a corporation of Delaware
No Drawing. Filed Oct. 1, 1965, Ser. No. 492,332
9 Claims. (Cl. 260—454)

This application is a continuation-in-part of my copending application Serial Number 288,510 filed June 17, 1963, now abandoned.

The present invention is concerned with organic chemistry and is more particularly concerned with novel (thiocyanato) phenol and substituted (thiocyanato) phenol compounds. The compounds of the present invention are of the formula

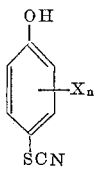

wherein X represents a halogen inclusive of pseudohalogen and $n$ is an integer such that the molecular weight of the present compounds is at least 220, $n$ being, in any case, not greater than 4.

The compounds are crystalline solids, although some of them liquefy readily, especially in the presence of impurities, so that purification or chilling or both may be necessary to crystallize them. Most of them are crystalline solids at temperatures substantially above room temperature.

The compounds are useful as antimicrobial preservatives to be added to paints susceptible of microbial degradation, they are useful for the control of undesired weeds, and they are useful in the preparation of numerous useful derivative compounds.

The compounds are prepared in various ways. The best way now known is thiocyanation by means of thiocyanogen. Such thiocyanation is well known to those skilled in the art and may be carried out in conventional manner, due allowance being made for choice of starting materials. As guide in the choosing of starting materials, it is known that in thiocyanation of phenols the (thiocyanato) group seeks the position para to the phenolic hydroxyl group. Hence this position must be available for thiocyanation if the compounds of the present invention are to be formed. The unsubstituted para site is available.

Thiocyanation can be carried out by the employment, as thiocyanating agent, of the *free* pseudohalogen as the covalent dimer thiocyanogen. Good results are obtained. However, free thiocyanogen tends to be expensive; and less expensive routes to the desired product are available by the preparation of thiocyanogen or nascent thiocyanogen (which may be regarded as a free thiocyanato radical) prepared in situ. This preparation in situ is easily and efficiently accomplished by the contacting together of ammonium thiocyanate or an alkali metal thiocyanate such as sodium thiocyanate in solvent together with the phenol to be thiocyanated and the resulting mixture chilled to a temperature near to, for example, 0° C., whereat a halogen of choice, chlorine or bromine, or the like is introduced dropwise into the chilled mixture to obtain a reaction mixture wherein the desired (thiocyanato) phenol is formed in situ. In this method of synthesis, the product is readily purified by such routine methods as water washing to remove metallic halide, and recrystallization from solvent, if desired.

In such preparation, any inert reaction solvent of choice can be employed, but glacial acetic acid or methanol is preferred.

For a discussion of thiocyanation together with teaching which places it within ready reach of those skilled in the art see "Organic Synthesis," Reinhold, New York, 1957, by Migrdichian, volume 1, pages 454-455 and the references therein cited.

By suitable obvious permutations of the method and in particular by choice of starting phenols to be employed in processes there set forth and hereinbefore summarized, those skilled in the art can readily prepare all the compounds of the present invention.

The useful properties of the compounds of the present invention are available in the use of the unpurified reaction mixture wherein product is present. The impure but separated compound can be employed. When side effects are caused by impurities the compounds can readily be purified in known manners, as is set forth in the cited reference.

The following examples illustrate the present invention but are not to be considered as limiting thereof.

*Example 1.—2,3-dichloro-4-thiocyanato phenol*

51.5 grams 2,3-dichlorophenol and 92 grams sodium thiocyanate were dissolved in 230 milliliters of methanol that had previously been saturated with sodium bromide. The resulting solution was chilled in a vessel over a bath of ice and salt, and to it was added dropwise, during about 4 hours and with continuous stirring, a solution, of 19.5 grams bromine in 57 milliliters methanol previously saturated with sodium bromide. The use of the saturant sodium bromide is not critical.

Upon the completion of the addition of the bromine, the resulting mixture was stirred for one hour longer and was then poured into a mixture of ice and hydrochloric acid, whereupon a solid product separated and was collected by filtration. The filtration residue was thoroughly washed with water and found to be a yellow solid melting in the range of 110–120°. The yield of the crude product was 46 grams. The compound was recrystallized from a mixture of benzene and a light liquid aliphatic hydrocarbon mixture, to obtain pale yellow crystals melting at 126–130°. The compound was again recrystallized from benzene and found to be a pale yellow crystalline solid melting at 128–132°. Upon analysis the compound was found to have a composition of carbon, hydrogen, and nitrogen of 38.18, 1.46 and 6.39 percent by weight, respectively, as compared with theoretical values of 38.2, 1.36 and 6.37, respectively. Infrared analysis confirmed the assigned spectrum.

*Example 2.—2,5-dichloro-4-thiocyanato phenol*

A solution of 104 grams 2,5-dichlorophenol, 185 grams of sodium thiocyanate in 460 milliliters methanol saturated with sodium bromide was chilled over an ice bath, and thereto was added dropwise, during about 4 hours, with stirring, a solution of 39 milliliters bromine in 115 milliliters methanol saturated with sodium bromide. Upon the completion of the addition of the bromide, the resulting mixture was stirred for an hour further and then poured into ice. The resulting mixture was filtered, and as a residue upon filtration, a solid was collected. The solid was washed with water, recrystallized repeatedly from an aromatic/aliphatic solvent system, to obtain a pale, yellow crystalline solid 2,5-dichloro-4-thiocyanato phenol product, melting at 129.5–131.5 degrees C. Upon analysis, the compound was found to have contents of carbon, hydrogen, and nitrogen of 38.21, 1.40 and 6.09, percent by weight, respectively; as compared with theoretical values of 38.2, 1.37, and 6.37, respectively. Infrared spectrum analysis confirmed the assigned structure.

*Example 3.—2,6-dichloro-4-(thiocyanato)phenol*

A mixture of 244.5 grams (1.5 mole) 2,6-dichlorophenol and 435 grams sodium thiocyanate in 1080 milliliters methanol saturated with sodium bromide was stirred, and cooled over a bath of ice and salt and thereto was added, dropwise and with continuous stirring over a period of about 5 hours, a solution of 91.5 milliliters bromine in 270 milliliters methanol previously saturated with sodium bromide.

The mixture was then poured into ice. A solid product separated in the resulting aqueous mixture, was collected by filtration, washed with water and air dried. The material was then recrystallized from an aromatic-aliphatic solvent system (benzene and a commercial aliphatic hydrocarbon solvent boiling in the range of 60–70° C.) to obtain pale yellow crystals melting at 95.5–97.5° C. The product was again recrystallized from benzene, to obtain yellow crystals of 2,6-dichloro-4-thiocyanato phenol melting at 98–99° C. The assigned structure was confirmed by infrared spectrum analysis. The product was found, by analysis, to have contents of carbon, hydrogen, and chlorine of 38.31, 1.38, and 32.29 percent by weight, respectively, as compared with theoretical values of 38.2, 1.37, and 32.22 percent by weight respectively.

*Example 4.—3,5-dichloro-4-thiocyanato phenol*

In procedures essentially the same as the foregoing, employing 3,5-dichlorophenol, sodium thiocyanate, methanol saturated with sodium bromide as solvent, and bromine as metathesizing reactant with the sodium thiocyanate, there is obtained a 3,5-dichloro-4-thiocyanatophenol product as a yellow crystalline solid melting at 164–166° C.

*Example 5*

In procedures essentially the same as the foregoing, employing 2-bromo-6-chloro-phenol, sodium thiocyanate, methanol saturated with sodium bromide, and bromine, there is obtained a 2-bromo-6-chloro-4-(thiocyanato) phenol product as a yellow crystalline solid melting at 96–98° C.

*Example 6.—2,6-dibromo-4-thiocyanato phenol*

In procedures essentially the same as the foregoing employing 25.5 grams 2,6-dibromophenol, 30 grams sodium thiocyanate, and 6.5 milliliters bromine, the entire amount dissolved in 95 milliliters methanol saturated with sodium bromide, there is obtained a 2,6-dibromo-4-thiocyanato phenol product as pale yellow crystalline solid melting at 110–112° C.

In other procedures essentially the same as the foregoing, but employing other starting halogenated phenol compounds, other products of the present invention are prepared:

From 3-iodophenol, potassium thiocyanate and bromine in glacial acetic acid saturated with sodium bromide, there is obtained a 3-iodo-4-(thiocyanato) phenol melting at 109–111° C.

Also, employing 5-chloro-2-cyanophenol ammonium thiocyanate, bromine, and, a solvent glacial acetic acid, there is obtained a 5-chloro-2-cyano-4-thiocyanatophenol product.

From 5-chloro-2-fluorophenol, sodium thiocyanate, and bromine, a 5-chloro-2-fluoro-4-(thiocyanato)phenol. From 3-cyanato-5-iodophenol, potassium thiocyanate, and bromine in methanol saturated with sodium bromide, there is obtained a 3-cyanato-5-iodo-4-thiocyanatophenol product as yellow crystals.

*Example 7.—2,3,5,6-tetrachloro-4-thiocyanato phenol*

In a one-liter flask was prepared a slurry of 65 grams, 2,3,5,6-tetrachlorophenol melting at 110–112° C., 53 grams ammonium thiocyanate, and 500 milliliters methanol at 0 to 5° C. Thereto was added, slowly, dropwise and with stirring, 15.4 milliliters bromine.

Upon completion of the addition of bromine, the resulting reaction mixture was poured over ice and the ice permitted to melt at room temperature. The resulting aqueous mixture was filtered and the residue recrystallized repeatedly from methanol and water to obtain a 2,3,5,6-tetrachloro-4-thiocyanato phenol product as a white crystalline solid melting at 174–175° C. and having an infrared spectrum consistent with the stated structure.

Similarly, by choice of other appropriate starting materials, other products of the present invention are prepared.

The compounds of the present invention are useful as germicides and as selective herbicides. In such use they may be applied as the unmodified compound, preferably finely subdivided. Alternatively, they may be dissolved in an organic solvent and the resulting solution employed directly or dispersed with the aid of a surface active agent in water to obtain an emulsion which is thereafter employed. Also, the compound may be dispersed with or without the aid of solvent in an inert finely divided solid carrier material. The resulting preparations may be employed directly or dispersed in water.

In yet another procedure, when the substance to be protected from bacterial attack is susceptible of having the thiocyanatophenol of the present invention added directly to it without deleterious effects upon its use, the composition may be modified by the direct addition of the thiocyanatophenol of the present invention with or without the aid of a co-solvent or dispersing agent, directly thereto. An example of such substance is a latex paint.

The compounds are fungicides and adapted to control fungi that are dermal parasites such as *Trichophyton mentagrophytes* in reservoir loci from which dermal infection can be contracted. They are also algaecides useful for control of slimes such as *Vaucheria sessilis*.

In a representative operation, a styrene-butadiene latex paint susceptible of serious degradation by attack from micro-organisms is modified by the addition thereto of 1/10 of 1 percent of the weight of the said latex paint of 2-bromo-6-chloro-4-thiocyanatophenol. The resulting paint was inoculated with a mixed culture of organisms collected from samples of spoiled latex paints and maintained in culture for test purposes, and the inoculated paint was then incubated under favorable conditions, for a period of time. A similar sample of the same lot of latex paint, not modified by the addition of a compound of the present invention was similarly inoculated and incubated. At the conclusion of a period of approximately 2 days, the said samples were withdrawn and examined. The inoculated and unmodified paint sample showed seriour degradation and the development of numerous colonies of microorganisms whereas the sample of the said latex paint containing the compound of the present invention was essentially free from attack by microorganisms.

I claim:
1. Compound of the formula

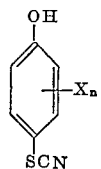

wherein X represents a member of the group consisting of fluoro, chloro, bromo, iodo, and cyano and $n$ is an integer such that the molecular weight of the compound is at least 220, $n$ being not greater than 4.

2. 2,3-dichloro-4-thiocyanatophenol.

3. 2,5-dichloro-4-thiocyanatophenol.
4. 2,6-dichloro-4-(thiocyanato)phenol.
5. 3,5-dichloro-4-thiocyanatophenol.
6. 2-bromo-6-chloro-4-(thiocyanato)phenol.
7. 3-iodo-4-(thiocyanato)phenol.
8. 2,6-dibromo-4-(thiocyanato)phenol.
9. Tetrachloro-4-(thiocyanato)phenol.

References Cited by the Examiner
UNITED STATES PATENTS
2,562,948   8/1951   Robbins et al. _____ 260—454

CHARLES B. PARKER, *Primary Examiner.*

F. D. HIGEL, *Assistant Examiner.*